United States Patent [19]

Scharfen et al.

[11] 4,007,943
[45] Feb. 15, 1977

[54] POWER OPERABLE JAW CHUCK

[75] Inventors: Hans Scharfen, Meerbusch; Josef Steinberger, Dusseldorf, both of Germany

[73] Assignee: Paul Forkardt Kommanditgesellschaft, Dusseldorf, Germany

[22] Filed: July 8, 1975

[21] Appl. No.: 594,021

[30] Foreign Application Priority Data

July 29, 1974 Germany .................. 2436529

[52] U.S. Cl. ..................... 279/121; 279/4
[51] Int. Cl.² ........................ B23B 31/16
[58] Field of Search .......... 279/4, 121, 74, 116

[56] References Cited

UNITED STATES PATENTS

| 3,456,955 | 7/1969 | Bruinsma | 279/4 X |
| 3,501,159 | 3/1970 | Scharfen | 279/4 |
| 3,659,864 | 5/1972 | Blattry | 279/121 |
| 3,698,729 | 10/1972 | Scharfen et al. | 279/4 |

FOREIGN PATENTS OR APPLICATIONS

| 193,685 | 2/1957 | Austria | 279/121 |
| 2,052,037 | 4/1972 | Germany | 279/121 |
| 1,088,315 | 9/1960 | Germany | 279/121 |
| 958,893 | 2/1957 | Germany | 279/121 |
| 344,887 | 4/1960 | Switzerland | 279/121 |

*Primary Examiner*—Leonidas Vlachos
*Assistant Examiner*—W. R. Briggs
*Attorney, Agent, or Firm*—Walter Becker

[57] ABSTRACT

A jaw chuck for mounting on a spindle in which a chuck body is provided which has chuck jaws radially reciprocable thereon. A piston is reciprocable on the chuck axis and cooperating elements of cam means are provided on the piston and the jaws for positively moving the jaws on the chuck body. A fluid piston is connected by a draw bar to the jaw actuating piston for actuation thereof. The pistons are normally movable within that range in which the cam elements are engaged but can be moved to a position where the cam elements are disengaged to permit the jaw elements to be removed from the chuck body. Detent and safety means are provided for preventing the jaws from coming out of the chuck body except when deliberately removed therefrom.

8 Claims, 3 Drawing Figures

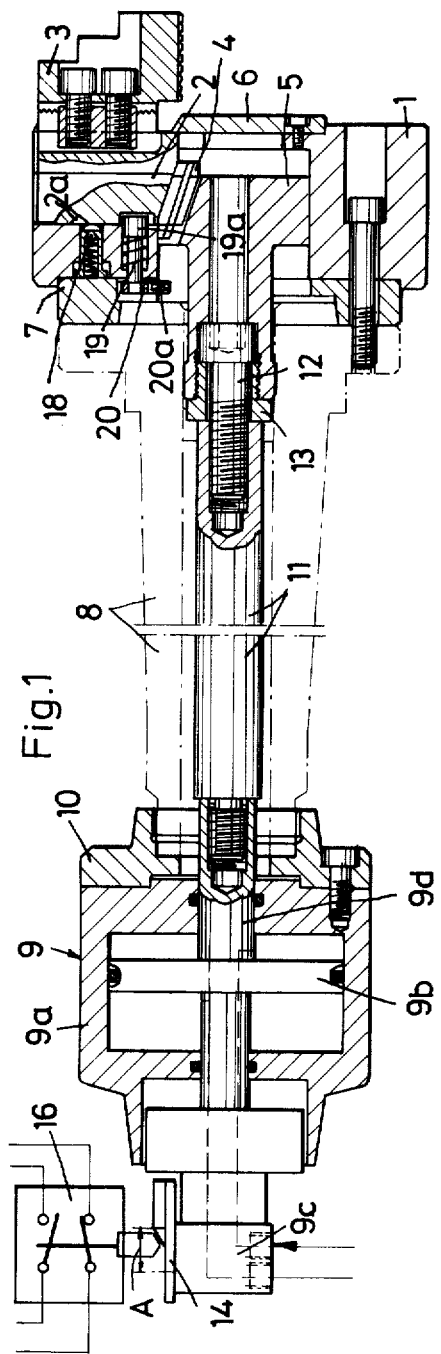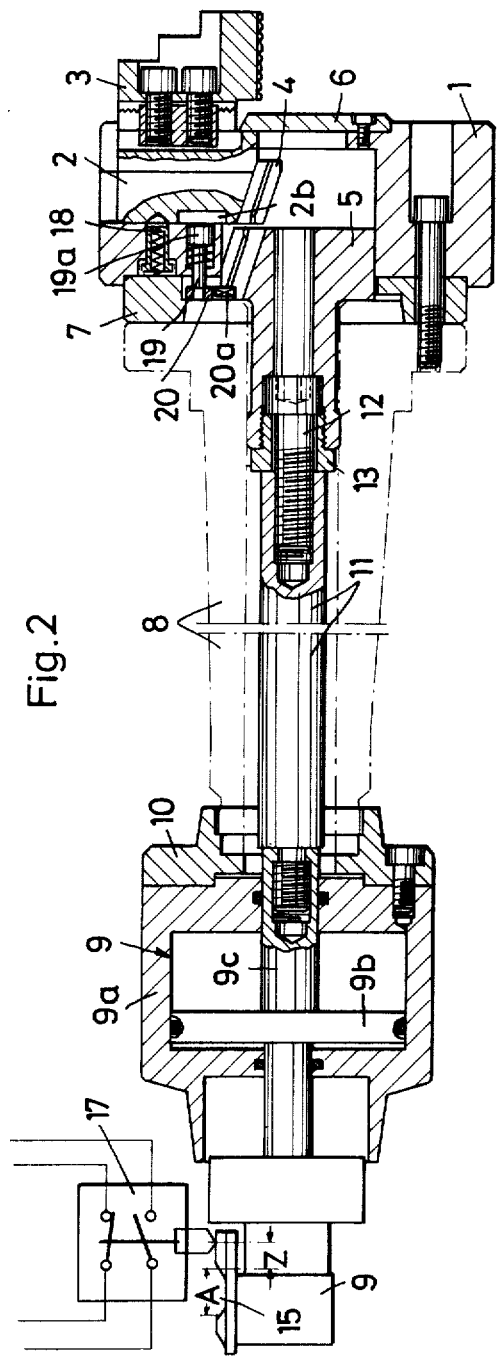

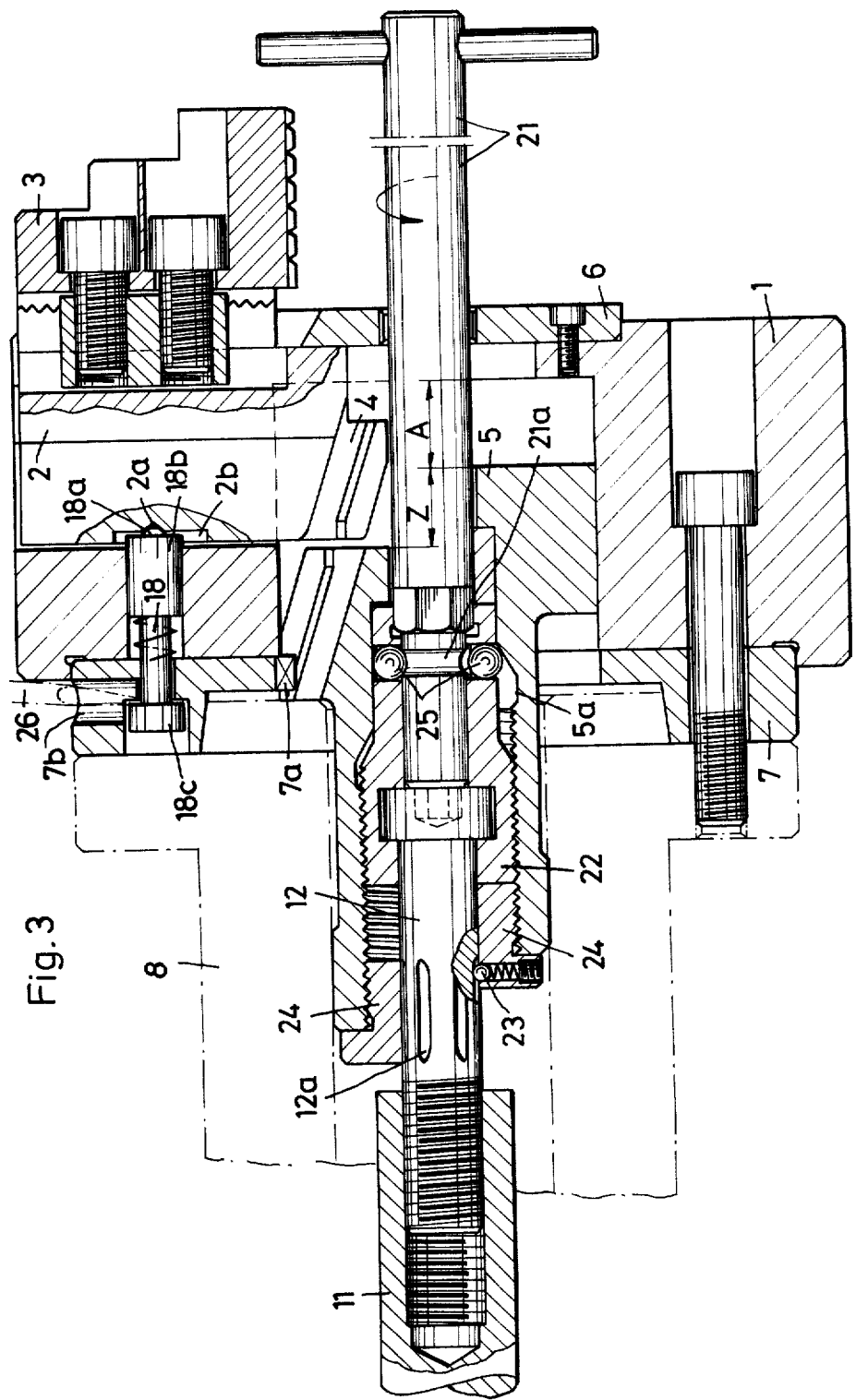

POWER OPERABLE JAW CHUCK

The present invention relates to a power operable chuck with clamping jaws which are radially movably guided in a chuck body and which are respectively operable through the intervention of a wedge-shaped hook by means of a chuck piston displaceably axially guided in the chuck body.

In order to be able with power operable chucks of the above mentioned type to exchange the base jaws or all of the clamping jaws without disassembling the chuck from the spindle of the machine tool, the clamping jaws have been provided with an L-shaped wedge hook which by a turning of the chuck piston can be freed or disengaged from its guiding means on the chuck piston. The clamping jaws can in disengaged position be radially pulled out of the chuck body and can in a minimum of time be replaced by similar clamping jaws. Inasmuch as considerable bending moments occur at the L-shaped wedge hook, chucks of this type are not suitable for higher clamping forces. For conveying high clamping forces, T-shaped double wedge hooks are required which halve or reduce by 50% the stresses in the chuck piston and convey these stresses in the form of pulling forces into the base jaws. By a roof-shaped design of the T-shaped double wedge hook, it has furthermore been made possible considerably to improve the flow of the forces in order to be able to introduce still higher pulling forces into the clamping jaws.

Chucks with T-shaped double wedge hooks, however, have the drawback that the chuck has to be dismounted for purposes of exchanging the jaws or for cleaning the spindle of the machine tool.

It is, therefore, an object of the present invention to provide a power operable chuck of the above mentioned general type, in which the clamping jaws, especially the base jaws, can be quickly and safely exchanged without detaching the chuck from the spindle.

These and other objects and advantages of the invention will appear more clearly from the following specification in connection with the accompanying drawings, in which:

FIG. 1 is a longitudinal section through a chuck in the working position, which is arranged on a spindle and is actuated by a cylinder piston system operable by oil under pressure.

FIG. 2 represents a longitudinal section similar to that of FIG. 1, in which the chuck piston occupies its rearmost end position.

FIG. 3 illustrates a longitudinal section through a second embodiment of the present invention, and more specifically of a chuck connected to a spindle while the chuck piston in the upper portion of FIG. 3 occupies its rearmost end position whereas in the lower portion of FIG. 3 it occupies one of its working positions.

The chuck according to the present invention is characterized primarily in that the chuck piston is moveable out of its working range into a rear end position in which the chuck piston disengages the wedge-shaped hook of the clamping jaws. The chuck according to the invention is furthermore characterized in that the chuck piston is outside the working range secured against turning, and that the clamping jaws are adapted by means of a spring urged bolt engaging a notch or tension point to be secured in the innermost position.

The above design results in a power operable chuck the clamping jaws of which preferably by T-shaped double wedge hooks are connected to the chuck piston are adapted in a defined position of the chuck piston outside the working range proper of the chuck to be taken in radial direction out of the chuck body without detaching the chuck from the machine tool spindle.

With a preferred embodiment of the invention, the chuck piston is by means of the actuating element bringing about the movement in the working range adapted from the working range to be displaced into the rear end position. In this connection, limit switches are provided which on one hand limit the movement of the actuating element to the working range, and on the other hand, when the actuating member is to be displaced into the rear end position prevent a rotary movement of the spindle carrying the chuck.

With this embodiment of the invention, the required additional movement for separating the chuck piston from the wedge-shaped hooks is effected by the actuating element proper of the chuck, for instance a compressed air operable or compressed oil operable cylinder piston system or an electro turnbuckle. By the arrangement of limit switches, it will be assured that the chuck mounted on the spindle cannot be put into turning motion when the clamping jaws are not in engagement with the chuck piston.

For a further embodiment of the invention, it is suggested to arrange the chuck piston for axial displacement on the pull rod of the actuating member so that without any additional movement of the actuating element, the chuck piston can be disengaged from the wedge-shaped hooks of the clamping jaws.

With this embodiment of the invention, according to a further development of the invention, the chuck piston is by means of a screw sleeve connected to the pull rod, which sleeve is axially nondisplaceably mounted on the pull rod and through the intervention of its thread is connected to the chuck piston. A rotation of the screw sleeve brings about an axial displacement of the chuck piston relative to the push rod of the actuating element. Due to this displacement, the chuck piston moves from its working range into the rear end position in which it releases the wedgeshaped hooks of the clamping jaws.

According to still another feature of the invention, the screw sleeve is arranged within the interior of the chuck piston and is turnable by means of a wrench which is introduced from the front side of the chuck. The wrench is in conformity with the invention secured against removal when the chuck piston occupies a position outside the working range so that a use of the chuck will not be possible as long as the wedge-shaped hooks are out of engagement with the chuck piston.

In order to secure the wrench against withdrawal, it is suggested in connection with the present invention to mount arresting balls in radial bores of the screw sleeve. These arresting balls either engage a holding nut on the wrench or an escape nut in the chuck piston. By engaging the holding groove on the wrench, the arresting balls prevent a withdrawal of the wrench. Only when the screw sleeve is actuated by the wrench in such a way that the chuck piston safely engages the wedge-shaped hooks of the clamping jaws, the arresting balls enter the escape groove in the chuck piston so that the wrench can be pulled off.

In order to assure not only a fixing of the clamping jaws in that position in which the chuck piston can be moved back from its rearmost end position into the working range but also in order to prevent the clamping jaws from flying out when a wedge-shaped hook or a chuck piston guiding means breaks, the spring-loaded bolt is according to the invention provided with a tip cooperating with the detention point on the clamping jaw and is also provided with a cylindrical abutment which engages a groove on the clamping jaw which groove merely permits a movement within the working range. For purposes of removing the clamping jaw when the chuck piston occupies its rearmost position, the bolt can according to a further feature of the invention, by means of a tool insertable through an opening in the chuck body be pulled back against the thrust of the spring.

In order to provide a corresponding safety with a chuck in which the chuck piston is by means of an additional movement of the actuating element displaced to its rearmost end position, it is suggested according to the invention in addition to a spring loaded bolt to provide a safety bolt which is equipped with a cylindrical abutment clement. The said safety bolt is spring urged and is by means of an abutment member during a movement of the chuck piston adapted by the chuck piston to be moved back from a groove of the clamping jaw to its rear end position.

Referring now to the drawings in detail, in both embodiments shown therein, the chuck comprises a chuck body 1 in which there are radially movably guided three clamping jaws each comprising a base jaw 2 and a face jaw 3. Each base jaw 2 is provided with a T-shaped wedge-like hook 4 engages corresponding recesses of a chuck piston 5. The chuck piston 5 is displaceably guided in axial direction in a centric bore of the chuck body 1. This bore of the chuck body 1 is at its front side closed by a cover 6. The chuck body 1 is by means of screws together with an intermediate ring 7 connected to the spindle 8 of a machine tool which is not illustrated in the drawings.

With the first embodiment according to FIGS. 1 and 2, the chuck piston 5 is actuated by a cylinder piston system 9 operated by oil under pressure. The cylinder piston system 9 is by means of a clamp ring 10 connected to the rear end of the spindle 8. The compressed air required for displacing the piston 9b is conveyed through a pressure oil conveying housing 9c to the cylinder piston 9 which rotates together with the spindle 8. The piston rod 9d of the piston 9b acted upon on both sides, is through a pull rod 11 rigidly connected to the chuck piston 5. More specifically, according to the embodiment illustrated in FIGS. 1 and 2, the piston or connecting rod 9d is rigidly connected to the chuck piston 5 by means of a screw 12 and a sleeve 13, said sleeve 13 being connected by means of screw 12 to the pull rod 11.

Arranged on the compressed oil conveying housing 9c are two cam strips 14 and 15 which respectively cooperate with an actuating element of a limit switch 16, 17. By means of the cam strip 14 and the limit switch 16 it will be assured that normally the stroke of the piston 9b will be so limited that the chuck piston 5 remains within its working range A which is entered on the cam strip 14. As soon as this working range A is exceeded, the cam strip 14 which is moved together with the housing 9c and with the piston 9b brings about a movement of the limit switch 16 which immediately turns off the supply of oil under pressure to the pressure oil cylinder piston system 9.

In order to be able to pull the piston 9b out of the working range A in such a way that the chuck piston 5 moves into the rearmost end position shown in FIG. 2, in which the wedge-shaped hooks 4 of the base jaws 2 no longer engage the chuck piston 5, a special switch has to be actuated. This switch (not shown in the drawing) bridges the limit switch 16 and in this way permits a supply of oil under pressure which moves the piston 9b into the position shown in FIG. 2. By means of the cam strip 15, the limit switch 17 is actuated during this additional movement Z. Switch 17 prevents a rotary movement of the spindle 8 and thus of the chuck 2. Only when the piston 9b has again been moved back into its working range A, will the limit switch 17 permit a turning-on of the rotary drive.

In order with an exchange of the clamping jaws, to hold the base jaws 2 which were newly inserted into the chuck body 1, in the position necessary for the moving-in of the chuck piston 5, a spring loaded bolt 18 is arranged in the chuck body 1. This bolt 18 engages by means of a tip a retaining or detention point 2a on the backside of the base jaw 2. When the clamping jaws move within the working range A, the bolt 18 is pressed back against the thrust of its spring. When the chuck piston 5, however, is located in its rearmost 3rd position in conformity with FIG. 2, the force of the spring will be sufficient to press the bolt 18 into the retaining point 2a of the base jaw 2 in such a way that said base jaw will remaim in the set position.

In order to prevent the clamping jaws from flying out of the chuck body 1 in case a wedge-shaped hook 4 breaks, there is in addition to the spring-loaded bolt 18 provided a spring-loaded safety bolt or plunger 19 arranged in the chuck body 1. This bolt or plunger 19 engages a groove 2b of the base jaw 2 and does so by means of a cylindrical abutment member 19a. This groove 2b permits merely a movement of the base jaw 2 within the working range A. The rear end of the safety bolt 19 is connected to an abutment member 20 which during a movement of the chuck piston 5 is carried along to the rear end position and in this way pulls back the cylindrical abutment member 19a of the safety bolt 19 out of the groove 2b of the base jaw 2. As a result thereof, in the rearmost end position of the chuck piston 5, as shown in FIG. 2, the base jaw 2 can after overcoming the spring force loading the piston 18, be taken out from the chuck body 1 in radial direction. As soon as the chuck piston 5 has been moved back by the cylinder 9 into the working range A, also the safety bolt 19 being spring loaded will pass with its cylindrical part 19a again into the groove 9b of the base jaw 2, whereby in case of a break of the wedge-shaped hook 4, the clamping jaw will be prevented from being thrown out. By means of a nose or abutment element 20a engaging the wedge-shaped groove of the chuck piston 5, the chuck piston 5 will be prevented from turning also when the chuck piston 5 is out of engagement with the wedge-shaped hooks which within the working range A prevent a turning of the chuck piston 5 within the chuck body 1. The nose or abutment element 20a on the plunger or bolt 19 engages the piston and holds the piston against rotation when moved beyond the range while simultaneously movement of the piston beyond the range will retract the safety plunger from the notch or groove.

According to the second embodiment of the invention illustrated in FIG. 3, the intermediate ring 7 is provided with a nose 7a which outside of the working range A engages a wedge-shaped groove of the chuck piston 5 and prevents a turning of the piston 5 within the chuck body 1. With this second embodiment, the chuck body 5 can be displaced merely within the working range A by the pull rod 11 of the actuating element (not shown) which may for instance be a compressed oil cylinder piston system according to FIG. 1 or a compressed air cylinder piston system or an electro turnbuckle. The additional movement Z illustrated in FIG. 3 is manually effected by means of a wrench 21. This wrench 21 is with its wrench surface introduced into a screw sleeve 22 which is axially nondisplaceable but rotatably mounted on the head of screw 12 which latter is screwed into the pull rod 11. The screw sleeve 22 is provided with an outer thread which is screwed into an inner thread of the chuck piston 5. A rotary movement of the screw sleeve 22 by means of the wrench 21 thus brings about an axial relative movement of the chuck piston 5 which relative to the pull rod 11 is non-rotatably held in the chuck body 1. In order in this connection to prevent the screw 12 from likewise turning, screw 12 is prevented from turning by means of a spring-loaded ball 23. This ball 23 engages a longitudinal groove 12a in screw 12 and is arranged in a sleeve 24 which is fixed on the chuck piston 5.

In order to prevent the chuck from being utilized when the chuck piston 5 occupies its rearmost end position illustrated in the upper section of FIG. 3, the wrench 21 is held fast in the chuck piston 5 when the latter is located within the range of the additional movement Z. This is brought about by a plurality of arresting balls 25 which are arranged in radial bores of the screw sleeve 22 and within the range of the additional movement Z engage an annular holding groove 21a of the wrench 21. Only when the chuck piston 5 by turning the wrench 21 has been moved back into the working range A, will the arresting balls 25 be able to escape into an annular escape groove 5a which is provided in the thread bore of chuck piston 5.

Also in the second embodiment according to FIG. 3, a spring-loaded bolt 18 is provided which by means of a tip 18 engages a detention point 2a of the base jaw 2 in order to keep the same in the position necessary for moving in the chuck piston 5. According to the second embodiment, the bolt 18 is also provided with a cylindrical abutment part 18b which cooperates with the groove 2b of the base jaw 2 in such a way that a movement of the base jaw 2 is normally possible only within the working range A.

In order to be able to remove the base jaw 2 from the chuck body 1, when the chuck piston 5 occupies its rearmost end position shown in the upper section of FIG. 3, the bolt 18 has to be pulled back against the thrust of its spring. This is brought about by means of a tool 26 for instance a screw driver which is introduced through a opening 7b and which is adapted to be introduced into the head 18c of bolt 18 as shown in FIG. 3.

With both embodiments it is possible once by means of the actuating element namely the compressed oil cylinder piston system 9, and on the other hand by means of the manually operable wrench 21, to disengage the chuck piston 5 by an additional movement Z from the wedge-shaped hooks 4 of the base jaws 2 so that also with a T-shaped design of these wedge hooks 4, an exchange of the clamping jaws will be possible in a simple manner and in a minimum time without removing the chuck from the spindle 8. In this connection, suitable steps are taken in order to prevent the danger of clamping jaws flying out of the chuck body 1 when the wedge-shaped hooks 4 do not engage the chuck piston 5.

It is, of course, to be understood that the present invention is, by no means, limited to the specific showing in the drawings but also comprises any modifications within the scope of the appended claims.

What is claimed is:

1. A power operable chuck adapted for connection to a rotary spindle and comprising; a chuck body, chuck jaws guided for radial movement on said body, a jaw actuating piston receiprocable on the axis of said body, interengageable elements of cam means on said piston and jaws for positively moving the jaws radially on said body in response to reciprocation of said piston on the axis of said body, means for power actuating said piston in each direction of reciprocation thereof, means normally limiting the reciprocation of said piston to that range over which said elements of cam means are engaged, means selectively operable for moving said piston beyond said range to disengage said elements of cam means, means for holding said piston against rotation when said piston is beyond said range, and detent means holding said jaws in said body and operable to permit said jaws to be removed from said body when said elements of cam means are disengaged, said detent means comprising a spring loaded plunger in said body for each jaw having a nose at the jaw end and a recess in the respective jaw for engagement by said nose, a notch in the jaw, and a spring loaded safety plunger having an end part in said notch to limit range of the radial movement of the jaw on the body, an abutment element of the safety plunger, said abutment element engaging said piston and holding the piston against rotation when moved beyond said range having means responsive to movement of the piston beyond said range to retract the safety plunger from said notch.

2. A power operable chuck according to claim 1 which includes a fluid operable actuating element for reciprocating said piston, and a pull rod connected at one end to said actuating element and at the other end to said piston.

3. A power operable chuck adapted for connection to a rotary spindle and comprising; a chuck body, chuck jaws guided for radial movement on said body, a jaw actuating piston reciprocable on the axis of said body, interengageable elements of cam means on said piston and jaws for positively moving the jaws radially on said body in response to reciprocation of said piston on the axis of said body, means for power actuating said piston in each direction of reciprocation thereof, means normally limiting the reciprocation of said piston to that range over which said elements of cam means are engaged, means selectively operable for moving said piston beyond said range to disengage said elements of cam means, means for holding said piston against rotation when said piston is beyond said range, and detent means holding said jaws in said body and operable to permit said jaws to be removed from said body when said elements of cam means are disengaged, a fluid operable actuating element for reciprocating said piston, and a pull rod connected at one end to said actuating element, a threaded sleeve rotatably but axially nonmovably mounted on the other end of said pull rod, and means forming a threaded bore in said piston threadedly engaging said threaded sleeve so that rotation of said threaded sleeve axially moves said piston within a predetermined range.

4. A power operable chuck according to claim 3, which includes wrench means adapted to fit means in said piston from the side opposite the pull rod for rotating said sleeve in the piston.

5. A power operable chuck according to claim 3 which includes locking means for locking the wrench means to said piston when said sleeve is rotated and moves said piston beyond said range.

6. A power operable chuck according to claim 5 in which said locking means includes at least one ball in a radial bore in said sleeve, a groove in the wrench which aligns with the radially inner end of said bore, and an incline in said piston at the radially outer end of the bore that releases said ball from the groove in the wrench only when the piston is within said range.

7. A power operable chuck according to claim 3 in which said detent means comprises a spring loaded plunger in said body for each jaw having a nose at the jaw end and a recess in the respective jaw for engagement by said nose, said jaw having a notch thereon in which said recess is located, said plunger having an end part in said notch and limiting range of the radial movement of the jaw on the body.

8. A power operable chuck according to claim 7 which includes an opening in said body exposing a part of said plunger and adapted to receive a tool for detraction of the plunger to release the jaw from the body.

* * * * *